(12) United States Patent
Nakagawa et al.

(10) Patent No.: US 8,634,707 B2
(45) Date of Patent: Jan. 21, 2014

(54) BD PLAYBACK SYSTEM, BD PLAYBACK DEVICE, DISPLAY DEVICE, AND COMPUTER PROGRAM

(75) Inventors: Seiichi Nakagawa, Kanagawa (JP); Susumu Ibaraki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 72 days.

(21) Appl. No.: 13/059,284

(22) PCT Filed: Oct. 23, 2009

(86) PCT No.: PCT/JP2009/005588
§ 371 (c)(1),
(2), (4) Date: Feb. 16, 2011

(87) PCT Pub. No.: WO2010/047123
PCT Pub. Date: Apr. 29, 2010

(65) Prior Publication Data
US 2011/0150417 A1   Jun. 23, 2011

(30) Foreign Application Priority Data
Oct. 24, 2008   (JP) .................................. 2008-274877

(51) Int. Cl.
*H04N 5/89*   (2006.01)
(52) U.S. Cl.
USPC ........... 386/336; 386/248; 386/234; 386/230; 386/335; 386/332
(58) Field of Classification Search
USPC .................. 386/248, 234, 230, 335–336, 332
See application file for complete search history.

(56) References Cited

U.S. PATENT DOCUMENTS

| | | | | |
|---|---|---|---|---|
| 8,045,429 | B2* | 10/2011 | Kitao et al. .................. | 369/47.1 |
| 8,224,155 | B2* | 7/2012 | Hamada ........................ | 386/248 |
| 8,237,741 | B2* | 8/2012 | Shimada et al. .............. | 345/621 |
| 2003/0226011 | A1 | 12/2003 | Kuwano et al. | |

(Continued)

FOREIGN PATENT DOCUMENTS

| | | |
|---|---|---|
| EP | 1551027 A1 | 7/2005 |
| EP | 1818932 A1 | 8/2007 |

(Continued)

OTHER PUBLICATIONS

International Search Report for PCT/JP2009/005588 dated Jan. 26, 2010.

(Continued)

*Primary Examiner* — Helen Shibru
(74) *Attorney, Agent, or Firm* — Pearne & Gordon LLP (57) ABSTRACT

Provided are a Blu-ray Disc (BD) playback system, a BD playback device, a display device, and a computer program which can report the status to the user during playback of BD content and can automatically provide an optimal user interface (UI). A BD playback device (110) is provided with an interactive content decision unit (113) for analyzing control data received from a disc reader (111) and determining whether a disc contains interactive content, and, if there is content, whether the interactive content should be played back. In addition, a display and operating device (120) is provided with an HMI control unit (123) for determining the status of the BD playback device (110) from the input from a communication unit (124) and displaying the appropriate HMI. The HMI control unit (123) controls the report to the user that interactive content exists when it has been determined that interactive content exists.

8 Claims, 8 Drawing Sheets

(56) References Cited

U.S. PATENT DOCUMENTS

| | | |
|---|---|---|
| 2003/0227568 A1 | 12/2003 | Stahl et al. |
| 2005/0158040 A1 | 7/2005 | Yuba |
| 2007/0047920 A1 | 3/2007 | Machida et al. |
| 2007/0140653 A1 | 6/2007 | Kozuka et al. |
| 2008/0080021 A1 | 4/2008 | Ohkita |
| 2008/0126993 A1* | 5/2008 | Fujii et al. ............. 715/840 |
| 2008/0244407 A1* | 10/2008 | Eklund et al. .......... 715/719 |
| 2008/0317433 A1* | 12/2008 | Hamada ................. 386/68 |
| 2009/0051824 A1 | 2/2009 | Satou |
| 2010/0034518 A1* | 2/2010 | Iwamoto et al. ........ 386/95 |
| 2012/0030366 A1* | 2/2012 | Collart et al. .......... 709/229 |
| 2012/0136930 A1* | 5/2012 | Fukuoka et al. ........ 709/203 |

FOREIGN PATENT DOCUMENTS

| | | |
|---|---|---|
| JP | 2004-56776 A | 2/2004 |
| JP | 2005-096596 A | 4/2005 |
| JP | 2005-203060 A | 7/2005 |
| JP | 2007-67593 A | 3/2007 |
| WO | 2008/069304 A1 | 6/2008 |

OTHER PUBLICATIONS

Extended European Search Report for Application No. 09821823.3-1907/2339843 dated Jun. 13, 2013.

* cited by examiner

PLAY BACK INTERACTIVE CONTENT ↓    ↑ PLAY BACK ONLY VIDEO/AUDIO CONTENT

START PLAYING BACK
INTERACTIVE CONTENT

PLAY BACK INTERACTIVE CONTENT     PLAY BACK ONLY VIDEO/AUDIO CONTENT

BD PLAYBACK SYSTEM, BD PLAYBACK DEVICE, DISPLAY DEVICE, AND COMPUTER PROGRAM

TECHNICAL FIELD

The present invention relates to a BD playback apparatus, a display apparatus and a computer program for playing back BD content, and, for example, relates to BD playback system in which a BD playback section and a display operating section are connected to a channel in a vehicle-mounted environment.

BACKGROUND ART

In recent years, various vehicle-mounted electronic devices have been developed accompanying the advancement of digital technology and communication technology. As a vehicle-mounted electronic device, there is a display apparatus that displays images recorded in a recording medium such as a CD-ROM and a DVD or television broadcasting and similar images using an LCD or suchlike display, like a navigation system, a DVD (Digital Versatile Disc) player and a television receiver.

Patent literature 1 discloses a vehicle-mounted apparatus that switches between and displays a menu screen for a touch panel, suitable for touch panel operation, and a menu screen for a remote commander, suitable for remote commander operation, and accepts operation by a user.

Also, for a vehicle-mounted multimedia device, introduction of a BD (Blu-ray Disc) is being studied.

BD application formats include BDAV (Blu-ray Disc Audio & Video), which is a format for a recordable BD-RE and BD-R, and BDMV (Blu-ray Disc Movie & Video), which is a format for a read-only BD-ROM. BDMV provides an object layer between a title list and a playlist which a user views on a screen of a player. Objects include "MovieObject" and "BD-J Object," and, in a title list, one title corresponds to either one these objects. A BD-J object supports Java™ language, which is also referred to as BD-J, and allows (1) Internet access, (2) downloading of related content, (3) downloading of language caption, (4) site cooperation, (5) game, and (6) downloading on a recording medium.

CITATION LIST

Patent Literature

PTL 1: Japanese Patent Application Laid-Open No. 2005-96596

SUMMARY OF INVENTION

Technical Problem

However, there are the following problems to introduce a BD as vehicle-mounted multimedia device.

Heretofore, whether content that is being played back is regular video and audio alone or includes interactive content (BD-J/BD-Live, for example) is not reported between a BD playback apparatus and a display/operation apparatus.

Consequently, when the BD playback apparatus and display/operation apparatus require different UIs (User Interfaces), a user has to expressly switch the UI. Therefore there is a problem that a user cannot know the current situation and has to perform complex operations.

It is therefore an object of the present invention to provide a BD playback system, BD playback apparatus, display apparatus and computer program that can report the latest situation to a user or automatically offer an optimal UI while BD content is being played back.

Solution to Problem

A blu-ray disc playback system according to the present invention has a blu-ray disc playback apparatus and a display apparatus that displays blu-ray disc content transmitted from the blu-ray disc playback apparatus, and the blu-ray disc playback system has: an interactive content identifying section that decides whether interactive content that is being played back comprises interactive content; and a control section that, when the interactive content is identified, performs a control to let a user know that interactive content is present.

A blu-ray disc playback apparatus according to the present invention plays back blu-ray disc content, and this apparatus has: an interactive content identifying section that decides whether content that is being played back is interactive content; and a communicating section that transmits a decision result in the interactive content identifying section to an external device being a communicating party of the blu-ray disc playback apparatus.

A display apparatus according to the present invention displays blu-ray disc content transmitted from a blu-ray disc playback apparatus, and, with this display apparatus, when content that is being played back is identified as interactive content, the blu-ray disc playback apparatus transmits this decision result to the display apparatus; and the display apparatus comprises: a communicating section that receives the decision result from the blu-ray disc playback apparatus; and a control section that performs a control to let a user know that the interactive content is being played back upon receiving the decision result in the communicating section.

Advantageous Effects of Invention

According to the present invention, it is possible to report the latest situation to a user or automatically offer an optimal UI while BD content is being played back. For example, by providing adequate display in the middle of interactive content, a user is able to understand the situation quickly. Furthermore, it is possible to offer a necessary series of operation according to eth situation, so that a user is able to perform operation without confusion.

DESCRIPTION OF EMBODIMENTS

Now, embodiments of the present invention will be described in detail with reference to the accompanying drawings.

Embodiment

Figure 1:
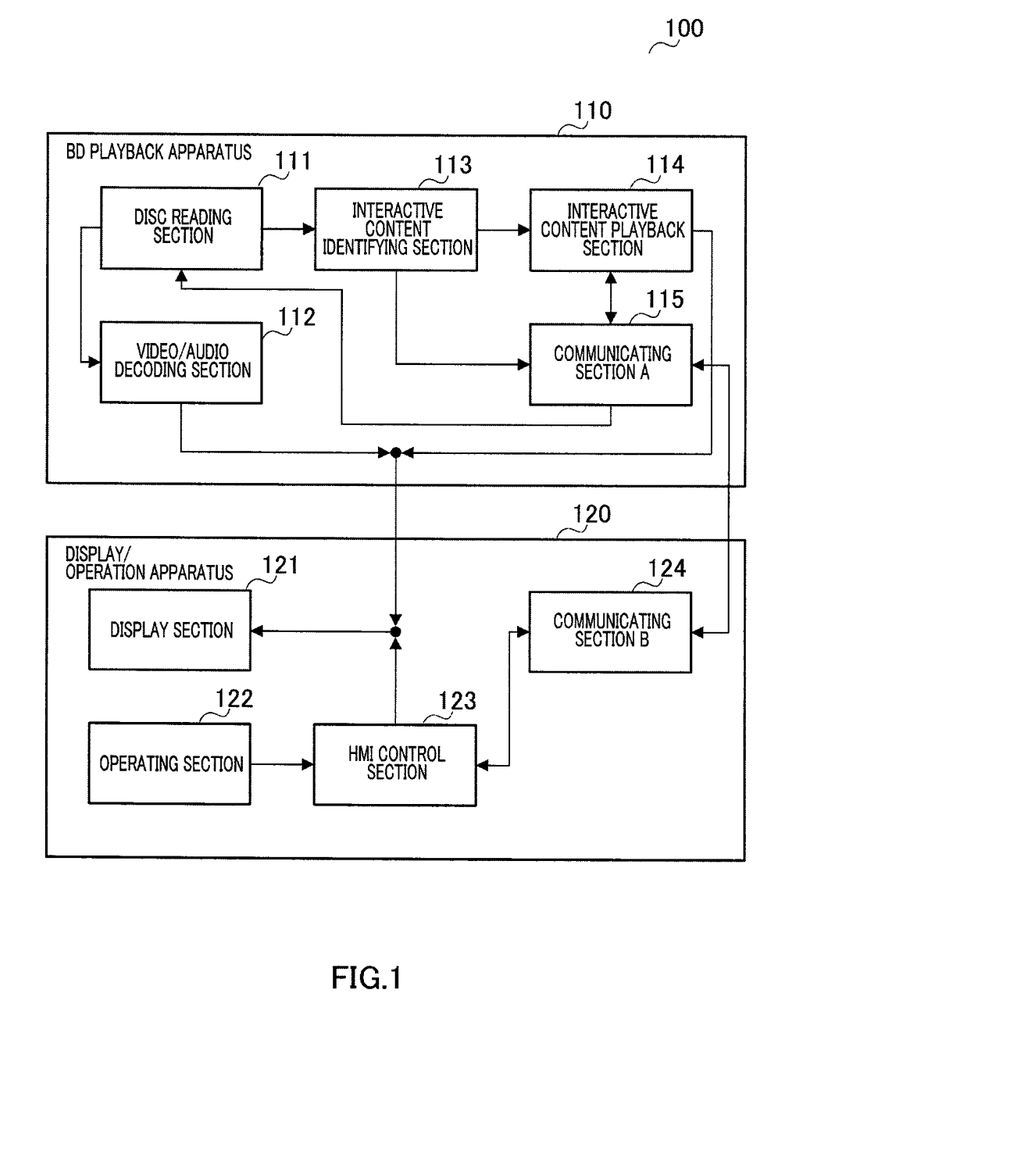
FIG. 1 is a block diagram showing a configuration of a BD playback system according to an embodiment of the present invention.

FIG. 1 is a block diagram showing a configuration of a BD playback system according to an embodiment of the present invention. This embodiment provides an example of applying a BD playback system to a vehicle-mounted apparatus.

In the following description, "interactive content" refers to the kind of BD content that is not formed only with video and audio content. BD-J/BD-live content is typical interactive content.

As shown in FIG. 1, BD playback system 100 is formed with a BD playback apparatus 110 and display/operation apparatus 120. With a vehicle-mounted apparatus, BD playback apparatus 110 is a BD deck unit, and display/operation apparatus 120 is an HMI (Human Machine Interface) unit.

BD playback apparatus 110 and display/operation apparatus 120 are provided in physically separate places and are connected by means of cabling or wireless communication.

BD playback apparatus 110 is composed of disc reading section 111, video/audio decoding section 112, interactive content identifying section 113, interactive content playback section 114, and communicating section 115 (communicating section A).

Display/operation apparatus 120 is composed of display section 121, operating section 122, HMI control section 123, and communicating section 124 (communicating section B).

Operating section 122 may be a key-operation section or may be a touch panel, a button switch, or a remote controller.

Disc reading section 111 reads a BD format disc, and outputs read data to video/audio decoding section 112 and interactive content identifying section 113.

Video/audio decoding section 112 decodes the video and audio data received as input from disc reading section 111, converts the decoded video and audio data to digital or analogue video and audio, and outputs this to outside BD playback apparatus 110.

Interactive content identifying section 113 analyzes control data received as input from disc reading section 111, and decides whether the disc contains interactive content (BD-J, for example) and, when the disc does contain interactive content, decides whether or not to play back the interactive content. Interactive content identifying section 113 transmits the decision result to communicating section 115 and transmits data to interactive content playback section 114. The operations of interactive content identifying section 113 will be described later in detail with reference to FIG. 6.

Interactive content playback section 114 plays back the data received as input from interactive content identifying section 113 on a Java™ virtual machine (VM) and outputs video and audio to outside BD playback apparatus 110. Incidentally, the JAVA™ VM does not perform compilation into a machine language and therefore does not rely upon CPU.

Communicating section 115 is connected to communicating section 124 by means of cabling or wireless communication, and outputs the overall conditions of BD playback apparatus 110 to display/operation apparatus 120 (the information including the state of playback/stop, the track number that is being played back, the playback time, indication of whether or not there is interactive content). Furthermore, communicating section 115 receives control information (including playback-start, stop, next track, fast forward, pause, disc ejection, etc.) from display/operation apparatus 120, and control disc reading section 111. In particular, communicating section 115 reports whether or not interactive content is being played back, as part of the conditions, to display/operation apparatus 120.

Display section 121 displays and outputs video and audio outputted from BD playback apparatus 110 and HMI control section 123.

Operating section 122 detects an input from a user using a combination of one or more of a touch panel, a button switch and a remote controller, and reports operation information to control section 123.

Based on the user input reported from HMI control section 123 and the state of BD playback apparatus 110 reported from communicating section 124, HMI control section 123 determines and draws an HMI to display, and outputs this to display section 121. HMI control section 123 performs a screen transition or changes display according to an input from operating section 122. According an input from operating section 122, HMI control section commands a control of BD playback apparatus 110 (including playback, stop, next track, fast forward, pause, disc ejection etc.) to communicating section 124. HMI control section 123 determines the state of BD playback apparatus 110 from the input and output of communicating section 124, and displays an adequate HMI. The details of HMI control section 123 will be described later with reference to FIG. 7 and FIG. 8.

Communicating section 124 reports information received as input from BD playback apparatus 110, to HMI control section 123. Furthermore, communicating section 124 reports information received as input from HMI control section 123, to BD playback apparatus 110.

Now, the operations of BD playback system 100 configured as described above, will be described.

First, the interactive content identifying method which interactive content identifying section 113 uses will be described.

[Interactive Content Identifying Method]

Figure 2:
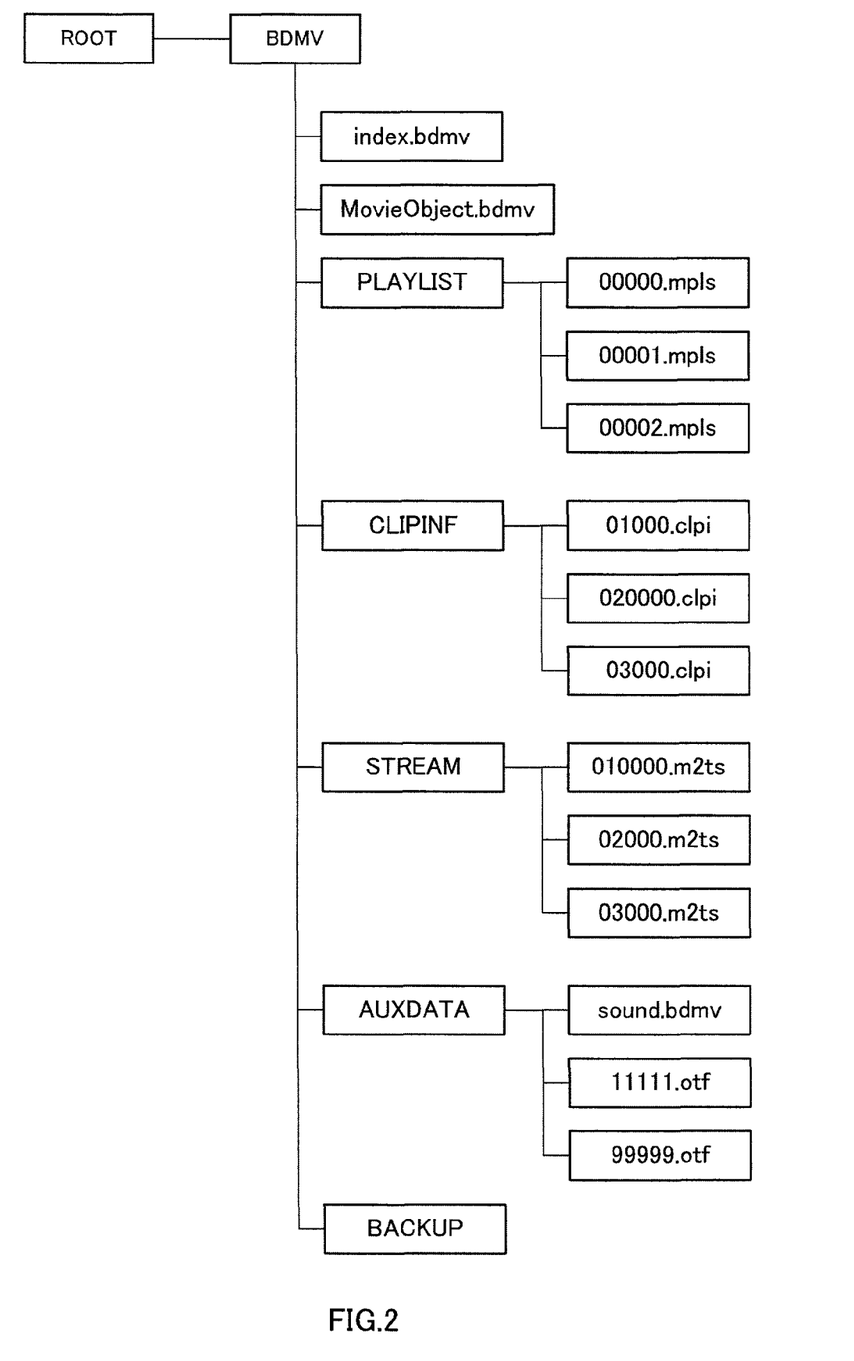
FIG. 2 shows a BDMV data structure by a BD playback system according to the above embodiment.

FIG. 2 shows a BDMV data structure. As shown in FIG. 2, BDMV has a directory structure with "index.bdmv," "MovieObject.bdmv," "PLAYLIST," "CLIPINF," "STREAM," "AUXDATA," and "BACKUP."

Interactive content identifying section 113 analyzes an index table file (index.bdmv) in a BD.

The index table file contains information about titles (contents) included in the BD.

There are three types of titles:

First Playback

The title to be executed first after a disc in inserted. Only one in a disc.

Top Menu

The title that is equivalent with the menu that is executed when the "menu" button on a remote controller is pressed. Only one in a disc.

Title

Besides the above titles, a plurality of titles may be present in a disc.

Each title is either "Movie Object" (video/audio title) or "BD-J Object" (interactive title to execute BD-J).

Whether "First Playback" is "Movie Object" or "BD-J Object" can be decided from the "FirstPlayback_object_type" field in the index table file.

Whether "TopMenu" is "Movie Objet" or "BD-J Object" can be decided from the "TopMenu_object_type" field in the index table file.

Whether "Title" is "Movie Object" or "BD-J Object" can be decided from the "Title_object_type" field in each title in the index table file.

For example, if a field is "01" in binary notation, its title is "Movie Object," or, if a field is "10" in binary notation, its title is "BD-J Object."

Based on the above criteria, interactive content identifying section 113 detects whether all titles included in an index table file are "Movie Object" or "BD-J Object." If there is at least one "BD-J Object" in a disc, interactive content identifying section 113 decides that "interactive content is included" in the disc.

Next, characteristic operation of BD playback apparatus 110 and display/operation apparatus 12 will be described.

[Characteristic Operation of BD Playback Apparatus 110]

Interactive content identifying section 113 of BD playback apparatus 110 decides whether BD content is playing back interactive content (BD-J/BD-live. or example) on a dynamic basis, and reports the decision result to display/operation apparatus 120 via communicating section 115.

[Characteristic Operation of Display/Operation Apparatus 120]

Figure 3A:
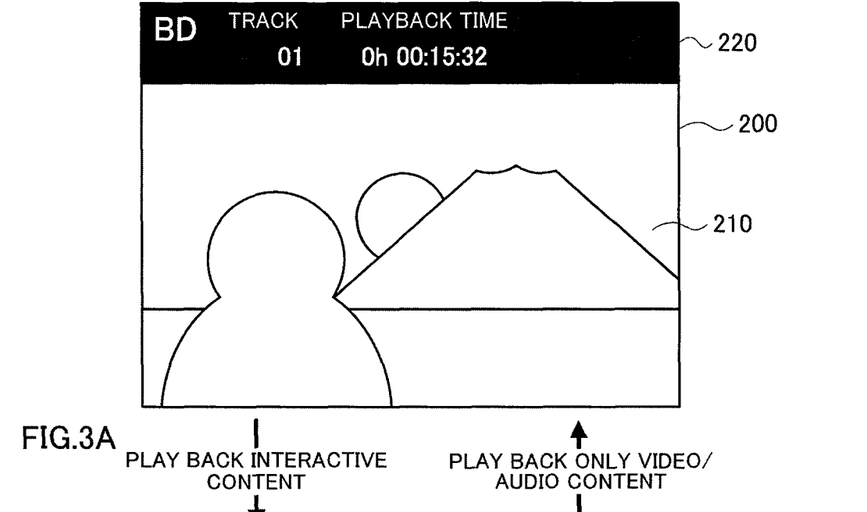
FIG. 3A and FIG. 3B show examples of a display section in a BD playback system according to the above embodiment.
Figure 3B:
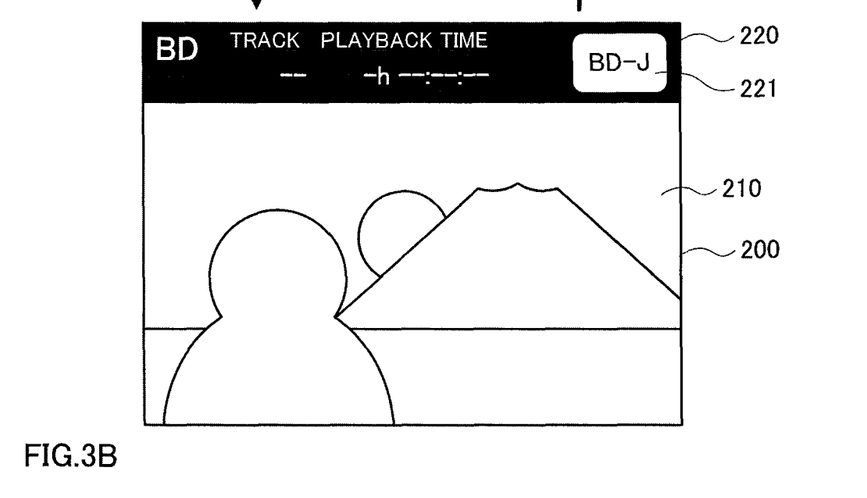
Figure 4A:
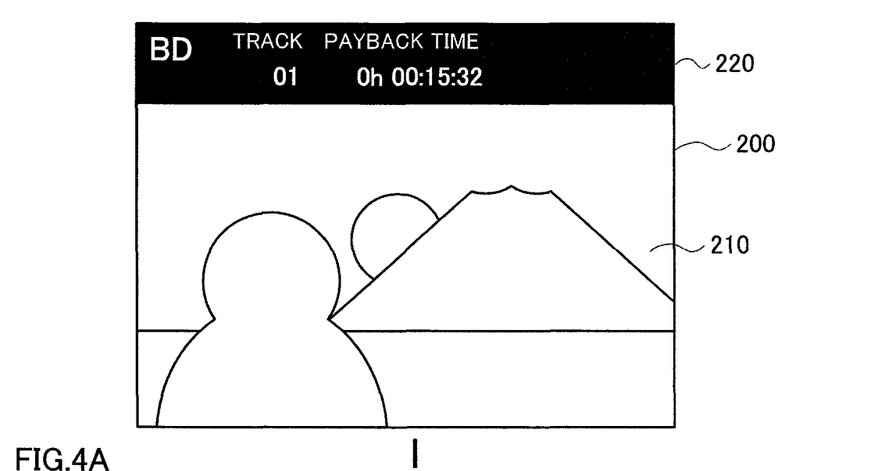
FIG. 4A and FIG. 4B show examples of a display section in a BD playback system according to the above embodiment.
Figure 4B:
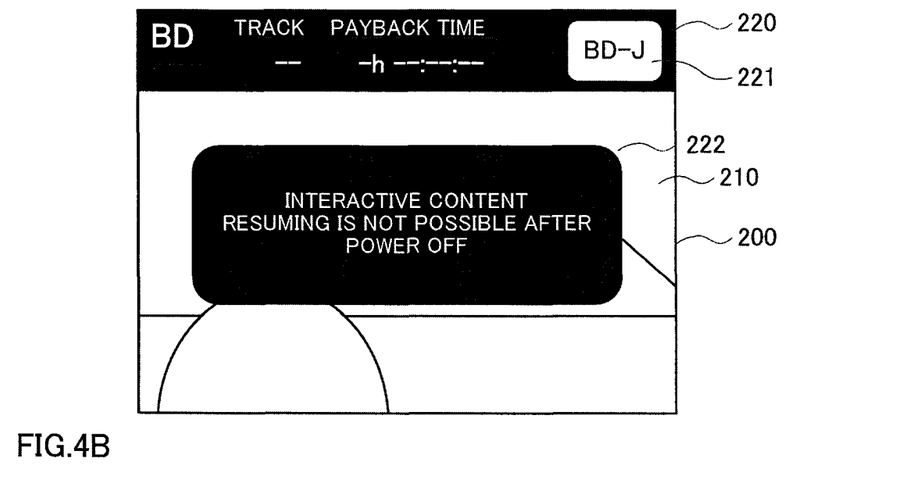
Figure 5A:
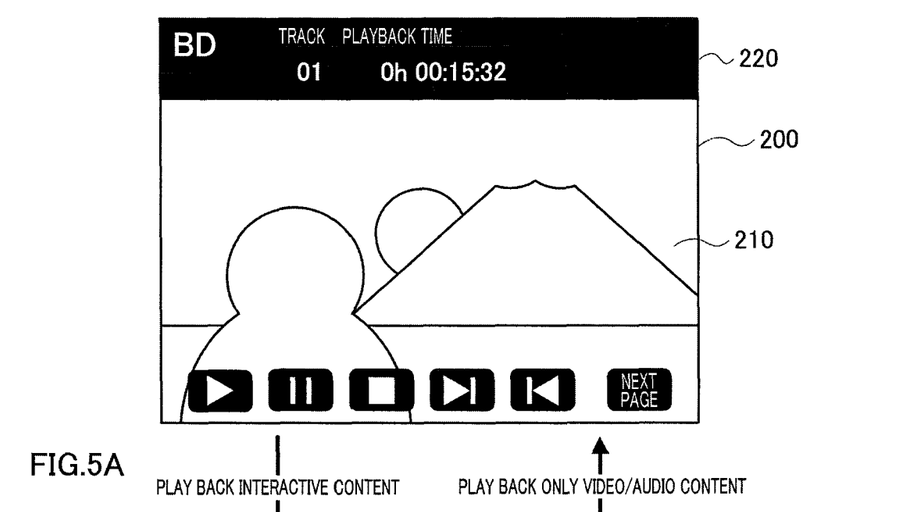
FIG. 5A and FIG. 5B show examples of a display section in a BD playback system according to the above embodiment.
Figure 5B:
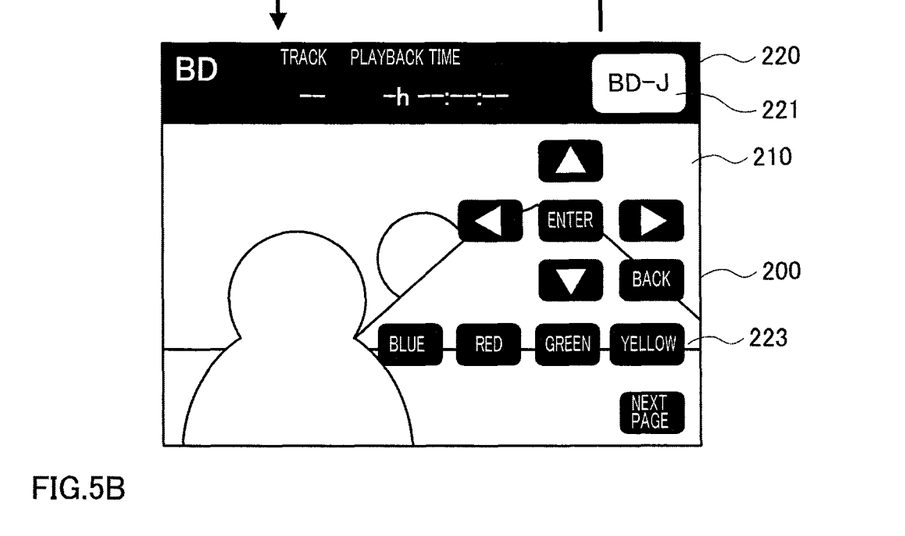

FIG. 3 through FIG. 5 show examples of display on display section 121. As shown in FIG. 3 through FIG. 5, display screen 200 of display section 121 has content display area 210 and state display area 220 above content display area 210. State display area 220 displays "BD," which tells that the disc is a BD, track, and playback time.

HMI control section 123 decides that the content that is being played back is interactive content, and performs the following control.

(1) Display an indication to the effect that a disc contains interactive content (see FIG. 3 B). If a disc contains interactive content, "BD-J" 221 in state display area 220 indicates this.

(2) Display an indication to the effect that interactive content is being played back (see FIG. 3A). During a playback of interactive content, state display area 220 displays "BD", track, and display time.

(3) Remove items (track number, playback time. etc.) that cannot be displayed during a playback of interactive content (see FIG. 3 B). If there is an item that cannot be displayed while interactive content is being played back, the track and display time on state display area 220 show blanks.

(4) Display that resuming is not possible upon restart after power off (resuming from the top of a disc or from the beginning of interactive content) is reported (FIG. 4B). If resuming is not possible upon restart after power off, "Interactive content Resuming is not possible after power off" 222 is displayed in the center of content display area 210, nearly over the entirety of content display area 210. Resuming here refers to the kind of operation in which a user stops and turns power off in an arbitrary place in video, and restarts video and audio from that place after power returns. The user is able to know in advance that a BD cannot be resumed and that the fact that a BD cannot be resumed after restart is not caused by operation error or deficiency.

(5) Display UI 233 necessary to operate interactive content (see FIG. 5 B). If there us not interactive content, utilizing a dynamic change of UI by means of a touch panel, that UI is removed (see FIG. 5A).

Figure 6:
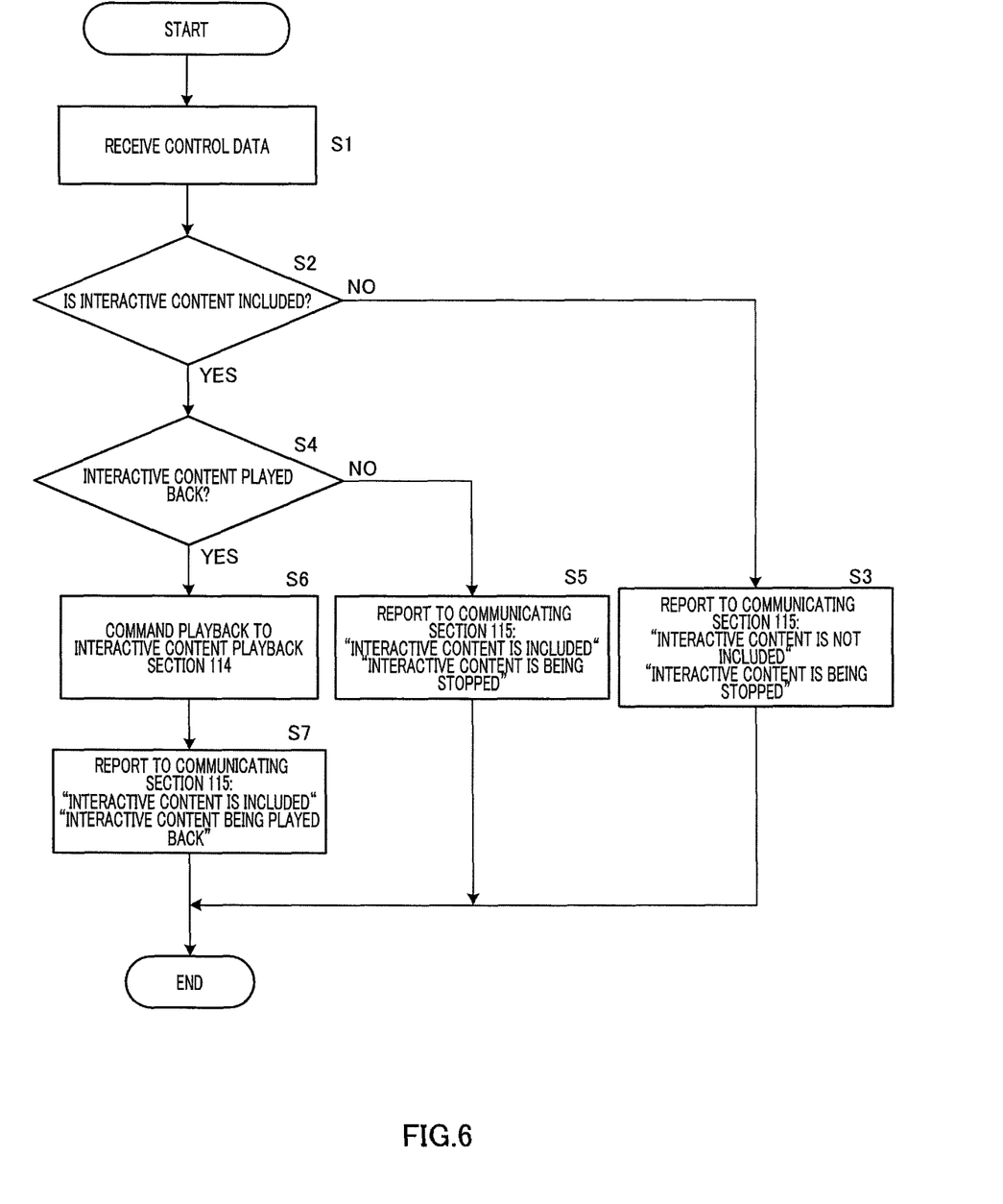
FIG. 6 is a flowchart showing interactive content reporting processing by a BD playback apparatus in a BD playback system according to the above embodiment.

FIG. 6 is a flowchart showing interactive content reporting processing by BD playback apparatus 110. The present flow is carried out per predetermined event. In this figure, "S" stands for "step."

In step S1, disc reading section 111 receives control data apart from video and audio.

In step S2, interactive content identifying section 113 determines whether or not interactive content is contained. The method of deciding whether or not interactive content is contained has been described above.

If interactive content is not contained, in step S3, interactive content identifying section 113 reports to communicating section 115 that "interactive content is not included" and "interactive content is being stopped," and this flow is finished. Communicating section 115 transmits this reporting result to communicating section 124 of display/operation apparatus 120.

If interactive content is not included, in step S4, interactive content identifying section 113 decides whether or not to play back an interactive content. Whether or not to play back interactive content is decided by means of automatic playback mode and also by means of user operation.

When interactive content is not played back, in step S5, interactive content identifying section 113 reports to communicating section 115 that "interactive content is included" and "interactive content is being stopped," and this flow is finished. Communicating section 115 transmits a reporting result to communicating section 124 of display/operation apparatus 120.

When interactive content is played back, in step S6, interactive content identifying section 113 commands a content playback to interactive content playback section 114.

In step S7, interactive content identifying section 113 reports to communicating section 115 that "interactive content is included" and "interactive content is being played back," and this flow is finished. Communicating section 115 transmits this reporting result to communicating section 124 of display/operation apparatus 120.

Figure 7:
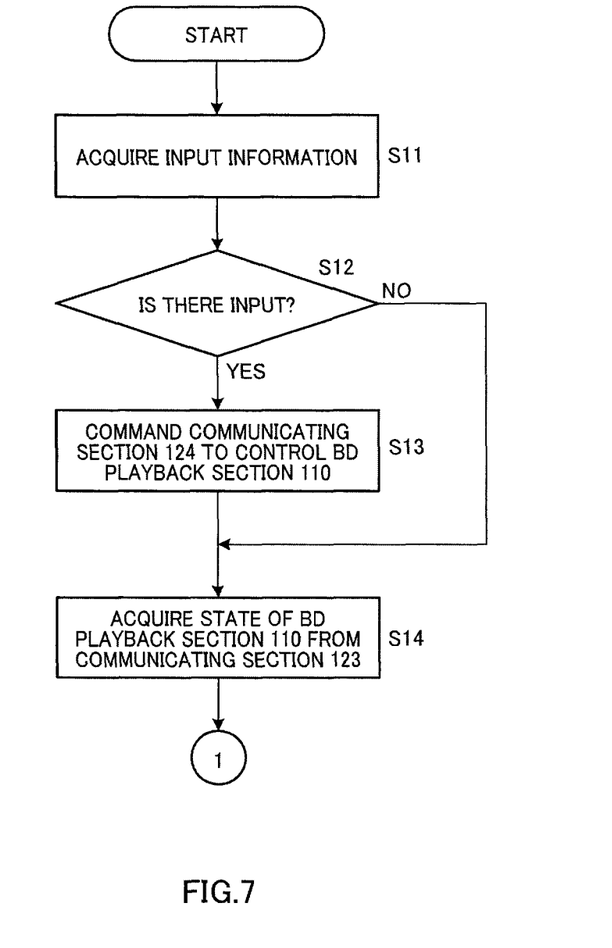
FIG. 7 is a flowchart showing interactive content output processing in a display/operation apparatus in a BD playback system according to the above embodiment.
Figure 8:
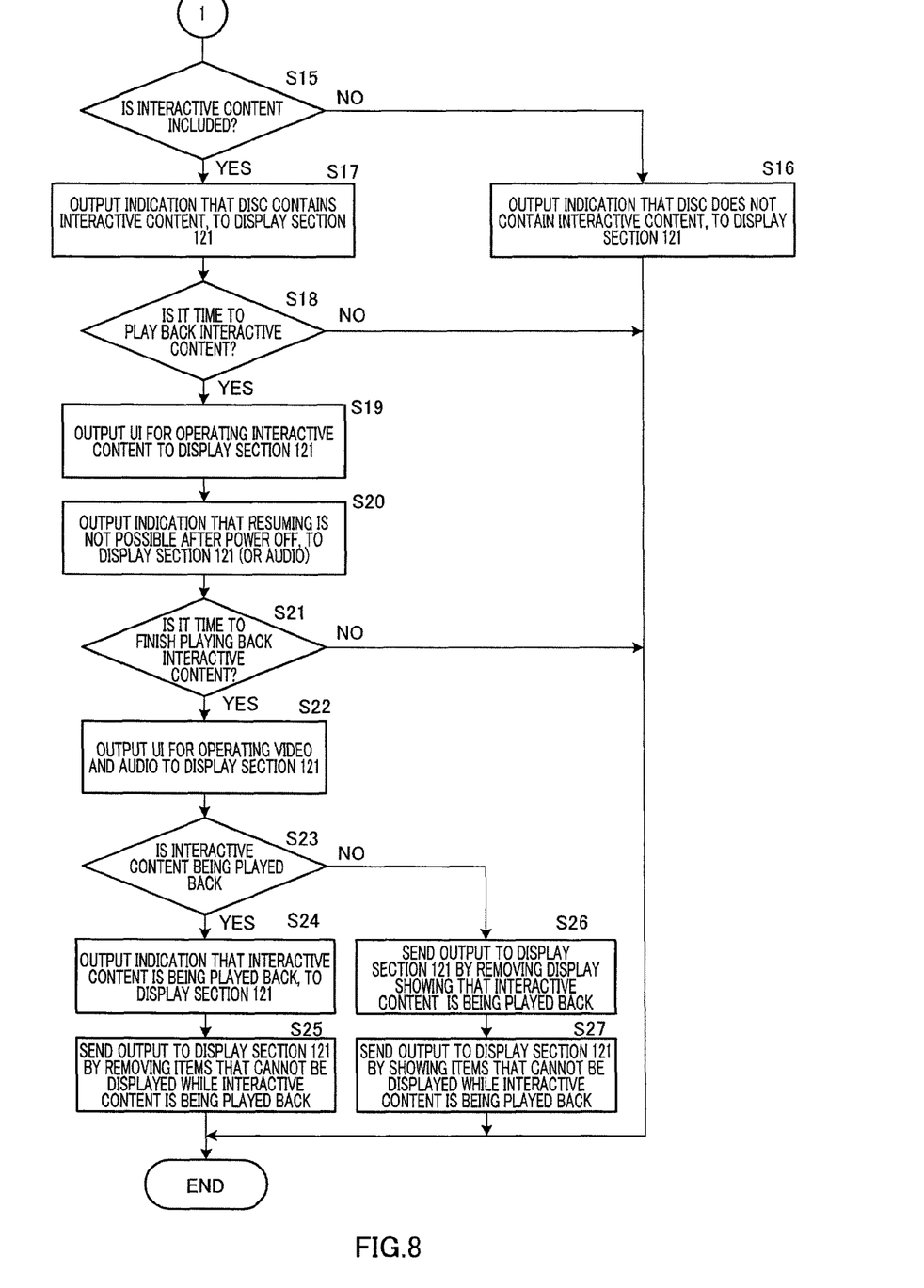
FIG. 8 is a flowchart showing interactive content output processing in a display/operation apparatus in a BD playback system according to the above embodiment.

FIG. 7 and FIG. 8 are flowcharts showing interactive content output processing in display/operation apparatus 120.

In step S11, operating section 122 acquires input information.

In step S12, HMI control section 123 decides whether or not there is an input from operating section 122, and the step moves to step S13 when there is an input or moves to step S14 when there is not an input.

In step S13, HMI control section 123 commands a control of BD playback apparatus 110 to communicating section 124. Here, HMI control section 123 performs a control to acquire the state of BD playback apparatus 110.

In step S14, HMI control section 123 acquires the state of BD playback apparatus 110 from communicating section 124.

In step S15, HMI control section 123 decides whether or not interactive content is contained. HMI control section 123 decides whether or not interactive content is contained from an interactive content report received as input from BD playback apparatus 110 via communicating section 124.

If interactive content is not contained, in step S16, HMI control section 123 outputs to display section 121 an indication to the effect that the disc contain does not contain interactive content, and the present flow is finished. As shown in FIG. 3A, display section 12 displays that the disc does not contain interactive content.

In above step S15, if interactive content is contained, in step S17, HMI control section 123 outputs to display section 121 an indication to the effect that the disc contains interactive content.

In step S18, HMI control section 123 decides whether or not it is the time to start playing back interactive content, and if it is not the time to start playing back interactive content, the present flow is finished.

If it is the time to start playing back interactive content, in step S19, HMI control section 123 outputs a U for operating interactive content to display section 121. As shown in FIG. 5B, display section 121 displays UI 223 for operating interactive content.

In step S20, HMI control section 123 outputs to display section 121 an indication to the effect that resuming is not possible upon restart after power off. As shown in FIG. 4B, display section 121 displays "Interactive content Resuming is not possible after power off" 222 in the center of content display area 210, nearly over the entirety of content display area 210.

The fact that resuming is not possible after power off may be notified via audio. For example, an audio synthesizing LSI (not shown) may send notification to a user via audio. Both display and audio may be used to give notification to a user.

In step S21, HMI control section 123 decides whether or not it is the time to finish playing back interactive content, and if it is not the time to finish playing back interactive content, the present flow is finished.

If it is the time to finish playing back interactive content, in step S22, HMI control section 123 outputs a U for operating video and audio to display section 121. As shown in FIG. 5B, display section 121 displays UI 223 for operating interactive content.

In step S23, HMI control section 123 decides whether or not interactive content is being played back, and, if interactive content is being played back, the step moves to step S24, or, if interactive content is not being played back, the step moves to step S26.

In step S24, HMI control section 123 output to display section 121 an indication to the effect that interactive content is being played back. Display section 121 displays that interactive content is being played back, as shown in FIG. 3A.

In step S25, HMI control section 123 sends an output to display section 121 by removing the items that cannot be displayed while interactive content is played back (for example, the track number). Display section 121 shows display by removing the items that cannot be shown while interactive content is played back, as shown in FIG. 3B.

If interactive content is not being played back in above step S23, in step S26, HMI control section 123 removes the display showing that interactive content is being played, and sends an output to display section 121. Display section 121 presents a display by removing the items that cannot be displayed while interactive content is played back, as shown in FIG. 5A.

In step S27, HMI control section 12 sends an output to display section 121 showing items that cannot be displayed while interactive content is played back. As shown in FIG. 5B, display section 121 shows display by removing the items that cannot be displayed while interactive content is played back.

As described above, with the present embodiment, BD playback system 100 is composed of BD playback apparatus 110 and display/operation apparatus 120. BD playback apparatus 110 has interactive content identifying section 113. Interactive content identifying section 113 analyzes control data received as input from disc reading section 111. Then, interactive content identifying section 113 decides whether a disc contains interactive content, and, when the disc does contain interactive content, decides whether or not to play back the interactive content. Furthermore, display/operation apparatus 120 has HMI control section 123 that decides the state of BD playback apparatus 110 from an input from communicating section 124 and displays an adequate HMI. Upon deciding that interactive content is present, HMI control section 123 performs a control to report to the user that interactive content is present.

By means of the above control, HMI control section 123 presents adequate display during interactive content, so that a user is able to understand the situation quickly.

By means of the above operation sequence according to the situation the user is able perform operation without confusion. In particular, when interactive content is present, by reporting that resuming is not possible after power is turned off, unnecessary confusion can be avoided. To be more specific, in the field of a personal computer (hereinafter "PC"), it is possible to realize a resuming function by a method of saving all information in a memory. Consequently, it is anticipated that a user who is accustomed to using a PC tends to believe that interactive content executed on a vehicle-mounted device can be resumed. By this means, in the field of a vehicle-mounted device, it is not easy to implement a resuming function due to various restrictions such as memory capacity, power supply environment and so on. Consequently, letting know a user in advance that there is no resuming function as with the present embodiment, is useful to prevent a user from unnecessary confusion. As described above, the present embodiment is suitable for use in a multimedia device control system in a vehicle-mounted environment.

The above descriptions show an embodiment of the present invention by way of example and by no means limit the scope of the present invention.

For example, although BD playback apparatus 110 and display/operation apparatus 120 are provided separately, it is equally possible to provide these as one. Also, any channel may content between BD playback apparatus 110 and display/operation apparatus 120. Channel may be a bus network that is prescribed by, for example, IEEE (Institute of Electrical and Electronics Engineers) 1394 High Performance Serial Bus (hereinafter IEEE1394) or by the MOST (Media Oriented Systems Transport) protocol. The communication method may be cabling or wireless communication.

Furthermore, although the term "BD playback system" has been used with the present embodiment for ease of explanation, other terms such as "device cooperating apparatus," "vehicle-mounted communication apparatus" and "multimedia device control system" may be used as well.

Furthermore, the types, number and connection method of the circuit components to constitute the above BD playback apparatus, including the communication section, memory section and others, are by no means limited to the above-described embodiment.

Also, a program for making the above-described BD playback system may be implemented. This program may be then stored in a computer-readable recording medium.

The disclosure of Japanese Patent Application No. 2008-274877, filed on Oct. 24, 2008, including the specification, drawings and abstract, is incorporated herein by reference in its entirety.

INDUSTRIAL APPLICABILITY

The BD playback system, BD playback apparatus, display apparatus and computer program according to the present invention are suitable for use with a multimedia device in a vehicle-mounted environment. Also, the present invention is by no means limited to a vehicle-mounted environment and is equally applicable to any and all apparatuses as long as a device-cooperating apparatus in which a BD playback section and a display/operation section cooperate is present.

REFERENCE SIGNS LIST

100 BD playback system
110 BD playback apparatus
120 Display/operation apparatus
111 Disc reading section
112 Video/audio decoding section
113 Interactive content identifying section
114 Interactive content playback section
115, 124 Communicating section
121 Display section
122 Operating section
123 HMI control section

The invention claimed is:

1. A blu-ray disc playback system comprising:
a blu-ray disc playback apparatus and a display apparatus that displays blu-ray disc content transmitted from the blu-ray disc playback apparatus, the blu-ray disc playback system comprising:
an interactive content identifying section that decides whether interactive content that is being played back comprises interactive content by analyzing an index table file on the blu-ray disc, and decides that interactive content is included in the blu-ray disc when at least one title included in the index table file is a BD-J Object; and
a control section that, when the interactive content is identified, performs a control to let a user know that resuming is not possible after power off in an interval before a reproduction of interactive contents finishes.

2. The blu-ray disc playback system according to claim 1, further comprising a user interface section, wherein, when the interactive content is identified, the control section changes a user interface in the user interface section.

3. The blu-ray disc playback system according to claim 1, wherein the control section removes items that cannot be displayed during the interactive content.

4. A blu-ray disc playback apparatus that plays back blu-ray disc content, the apparatus comprising:
an interactive content identifying section that decides whether content that is being played back is interactive content by analyzing an index table file on the blu-ray disc, and decides that interactive content is included in the blu-ray disc when at least one title included in the index table file is a BD-J Object; and
a communicating section that, when the interactive content is identified, transmits, to an external device being a communicating party of the blu-ray disc playback apparatus, that resuming is not possible after power off in an interval before a reproduction of interactive contents finishes.

5. A display apparatus that displays blu-ray disc content transmitted from a blu-ray disc playback apparatus, wherein:
when content that is being played back is identified as interactive content by identifying that at least one title included in an index table file on the blu-ray disc is a BD-J Object, the blu-ray disc playback apparatus transmits this decision result to the display apparatus; and
the display apparatus comprises:
a communicating section that receives the decision result from the blu-ray disc playback apparatus; and
a control section that performs a control to let a user know that the interactive content is being played back upon receiving the decision result in the communicating section in an interval before reproduction of interactive contents finishes.

6. A non-transitory computer-readable storage medium having stored thereon a computer program for a blu-ray playback system comprising a blu-ray disc playback apparatus that plays back blu-ray disc content and a display apparatus that displays blu-ray disc content transmitted from the blu-ray disc playback apparatus, the program comprising:
making the blu-ray disc playback apparatus execute processing for deciding whether content that is being played back is interactive content by analyzing an index table file on the blu-ray disc and identifying whether at least one title included in the index table file is a BD-J Object; and
making the display apparatus execute processing for letting know a user that resuming is not possible after power off in an interval before reproduction of interactive contents finishes when the interactive content is identified.

7. A non-transitory computer-readable storage medium having stored thereon a computer program for a blu-ray playback apparatus that displays blu-ray disc content, the program comprising:
making a computer execute processing for deciding whether content that is being played back is interactive content by analyzing an index table file on the blu-ray disc and identifying whether at least one title included in the index table file is a BD-J Object; and
making the computer execute processing for transmitting, to an external device being a communicating party of the blu-ray disc playback apparatus, that resuming is not possible after power off in an interval before reproduction of interactive contents finishes when the interactive content is identified.

8. A non-transitory computer-readable storage medium having stored thereon a computer program for a display apparatus that displays blu-ray disc content transmitted from a blu-ray disc playback apparatus, the blu-ray disc playback apparatus, when content that is being played back is identified as interactive content by identifying that at least one title included in an index table file on the blu-ray disc is a BD-J Object, transmitting this decision result to the display apparatus, the program comprising:
making a computer execute processing for receiving the decision result from the blu-ray disc playback apparatus; and
making the computer perform a control to let a user know that the interactive content is being played back upon receiving the decision result in the computer in an interval before reproduction of interactive contents finishes.

* * * * *